US006966653B2

(12) United States Patent
Kitabayashi

(10) Patent No.: US 6,966,653 B2
(45) Date of Patent: Nov. 22, 2005

(54) COOLING DEVICE AND OPTICAL DEVICE AND PROJECTOR HAVING THE COOLING DEVICE

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/824,369

(22) Filed: Apr. 15, 2004

(65) Prior Publication Data

US 2004/0257491 A1 Dec. 23, 2004

(30) Foreign Application Priority Data

May 30, 2003 (JP) .............................. 2003-154617

(51) Int. Cl.[7] .......................... G03B 21/14; G03B 21/16
(52) U.S. Cl. ........................................ 353/60; 353/119
(58) Field of Search ............................. 353/52, 57, 58, 353/60, 119

(56) References Cited

U.S. PATENT DOCUMENTS 6,139,155 A * 10/2000 Takizawa ..................... 353/57
6,488,380 B1 * 12/2002 Fujimori ..................... 353/119
6,568,813 B1 * 5/2003 Haba et al. ................... 353/57
6,572,231 B1 * 6/2003 Watanabe .................... 353/58
6,672,723 B2 * 1/2004 Sugimoto et al. ............. 353/57
6,736,513 B2 * 5/2004 Koyama et al. .............. 353/60
6,834,964 B2 * 12/2004 Nishihara et al. ............ 353/52

FOREIGN PATENT DOCUMENTS

JP    A 8-304739       11/1996
JP    A 2001-100185    4/2001

* cited by examiner

Primary Examiner—Christopher Mahoney
(74) Attorney, Agent, or Firm—Oliff & Berridge, PLC

(57) ABSTRACT

A cooling device (5) has a frame (51) as a chassis having a fan body (511) thereinside and a base portion (52) formed on the upper side of the frame (51), the frame (51) and the base portion (52) being made of a heat-conductive material. An object (44) to be cooled is fixed on the base portion (52) and heat is conducted from the object (44) to the base portion (52) where the conducted heat is radiated. The fan body (511) provided on the cooling device (5) blows a cooling air to cool the object (44). Accordingly, the heat on the object (44) is cooled by the cooling air blown by the fan body (511) and also by the heat-radiation by a heat radiator on the cooling device (5).

11 Claims, 7 Drawing Sheets the cooling device including a fan body that has a vane supported by a rotary shaft of a rotary drive source and a chassis that houses the fan body, in which the chassis is made of a heat-conductive material has a heat radiator that radiates a heat generated on the object to be cooled to an outside by heat conduction.

According to the above arrangement, the heat generated on the object to be cooled is conducted to the chassis of the cooling device, which is radiated by the heat radiator of the cooling device. According to the above arrangement, the object is cooled by two cooling systems, i.e. the cooling air blown from the fan body and heat radiation by the heat radiator after being thermally conducted to the chassis of the cooling device. Accordingly, the object can be efficiently cooled.

In the above aspect of the present invention, the chassis may preferably be formed of metal.

According to the above arrangement, since metal has higher heat conductivity than synthetic resin and the like, heat conduction efficiency from the object to be cooled can be improved as compared to a cooling device having a chassis of a synthetic resin. Accordingly, the heat conduction efficiency to the heat radiator can be improved and the heat on the heat radiator can be efficiently radiated.

In the above aspect of the present invention, a contact surface to be in contact with the object to be cooled may preferably be formed on the chassis According to the above arrangement, the heat generated on the object to be cooled is conducted to the chassis through the contact surface formed on the chassis to be radiated by the heat radiator. Accordingly, the heat of the object to be cooled can be directly conducted to the chassis of the cooling device, the heat conduction efficiency can be improved, thus further efficiently cooling the object to be cooled by heat radiation.

An optical device according to another aspect of the present invention has: a plurality of optical modulators that respectively modulate each of a plurality of color lights in accordance with image information; a color-combining optical system having a plurality of light-incident sides opposing to the optical modulators, the color-combining optical system combining the color lights modulated by the optical modulators; a plurality of optical converters respectively disposed between the optical modulators and the light-incident sides;

and a heat-conductive plate that opposes to the light-irradiation side and conducts the heat generated on the optical modulator and/or the optical converter, the heat-conductive plate being provided on the light-incident side of the color-combining optical system and abutted to the heat-radiator of the chassis of the above cooling device.

According to the above aspect of the present invention, approximately the same advantages as the above cooling device can be obtained. Specifically, the heat on the optical modulator and/or the optical converter provided on the optical device is conducted to the heat radiator of the cooling device through the heat-conductive plate to be radiated. Accordingly, the optical device can be efficiently cooled by two cooling mechanisms i.e. blowing the cooling air transferred by the fan body and heat conduction and radiation on the heat radiator of the cooling device.

In the above aspect of the present invention, the heat-conductive member may preferably be sapphire glass or quartz crystal.

According to the above arrangement, since sapphire glass and quartz crystal have high heat conductivity, the heat generated on the optical modulator and/or the optical con-

COOLING DEVICE AND OPTICAL DEVICE AND PROJECTOR HAVING THE COOLING DEVICE

BACKGROUND OF THE INVENTION

1. Field of the Invention

The present invention relates to a cooling device including a fan having a frame, and an optical device and a projector having the cooling device.

2. Description of Related Art

Conventionally, projectors that modulate a light beam irradiated by a light source in accordance with image information to form an optical image and projects the image in an enlarged manner have been used for presentations at conferences, scientific meetings, exhibitions and the like and for so-called home-theaters. Three-plate projectors have been known as such projectors. The three-plate projectors each have a light source, a color-separating optical system that separates the light beam irradiated by the light source into a plurality of color lights, a plurality of optical modulators that modulates the respective color lights separated by the color-separating optical system, a color-combining optical system that combines the light beam modulated by the respective optical modulators, and a projection lens for enlarging and projecting the light beam irradiated by the color-separating optical system.

The positions of the plurality of the optical modulators have to be precisely determined with each other so as not to cause pixel shift between the pixels of the image formation area of the respective optical modulators. Accordingly, the respective optical modulators are fixed and integrated to the color-combining optical system after adjusting the relative positions thereof to form an optical device. Further, a clear image cannot be formed unless the image formation area of the optical modulator is located at the back-focus position of the projection lens. Accordingly, an L-shape-sided assembly has been conventionally used, where the optical device is mounted on an interior side of the horizontal portion of the L-shape of the assembly and the projection lens is attached to the exterior side of the L-shape of a vertical portion vertically provided on the horizontal portion. According to the above optical device, since the optical device can be manufactured independent of the assembly of the projector, the assembly process of the projector can be simplified.

Such optical devices also include optical elements such as polarization plates in addition to the optical modulator, which are weak to heat and are required to be efficiently cooled. Accordingly, a cooling fan is disposed on the lower side of the horizontal portion of the assembly and a hole is provided on the horizontal portion, where air is blown by the cooling fan to cool the optical device (see Japanese Patent Laid-Open Publication No. 2001-100185).

However, in the above optical device, since the optical device is cooled only by the air blown by the cooling fan, the heat of the optical device that increases in accordance with intensifying illuminance of the light source cannot be efficiently cooled.

SUMMARY OF THE INVENTION

An object of the present invention is to provide a cooling device capable of efficiently cooling an object to be cooled, and an optical device and a projector having the cooling device.

A cooling device according to an aspect of the present invention blows a cooling air to a heated object to be cooled, verter is rapidly conducted to the heat-conductive plate. Accordingly, abrupt rise in temperature of the optical modulator and/or the optical converter can be prevented and thermal deterioration can be restrained. Further, since the heat is rapidly conducted to the heat radiator by virtue of the high heat conductivity of sapphire glass and quartz crystal, the cooling efficiency by heat radiation can be improved, so that the optical device can be further efficiently cooled. Further, since the transmissivity of the incident light beam of sapphire glass and quartz crystal is higher than an ordinary glass sheet, decrease in the light volume irradiated on the optical device can be restrained.

In the above aspect of the present invention, a base that supports the color-combining optical system may preferably be formed on the chassis of the cooling device at a position corresponding to the rotary shaft of the rotary drive source.

According to the above arrangement, since the color-combining optical system is supported on the base of the cooling device, the cooling device can be used as a base of the color-combining optical system. Accordingly, no additional component for supporting the color-combining optical system is necessary, so that the structure of the optical device can be simplified and the production steps and cost can be reduced. Further, since the base portion is formed on the chassis of the cooling device at a position corresponding to the rotary shaft, the cooling air can be blown approximately uniformly on the heat-conductive plate on the respective light-incident sides of the color-combining optical system supported on the base. Accordingly, the respective heat-conductive plates can be cooled approximately uniformly by blowing the cooling air.

In the above aspect of the present invention, a bulging portion that adjusts the attitude of the color-combining optical system relative to the chassis may preferably be formed on a surface of the base on which the color-combining optical system is supported.

According to the above arrangement, the color-combining optical system can be disposed at an appropriate position relative to an illumination optical axis by adjusting the attitude of the color combining optical system with the bulging portion. Therefore, even when the light-incident side of the color-combining optical system is inclined, the color-combining optical system can be attached at an appropriate position relative to the cooling device.

In the above aspect of the present invention, the chassis may preferably have a projection lens attachment that extends in an air-blow direction of the cooling device on which a projection lens that enlarges and projects the light beam irradiated by the color-combining optical system is attached.

The projection lens attachment may be integrated with the cooling device or, alternatively, be attached as an independent body.

According to the above arrangement, since the projection lens is attached to the projection lens attachment provided on the chassis of the cooling device, the color-combining optical system can be precisely located at the back focus position of the projection lens. Further, since the optical device and the projection lens are connected by the cooling device, no additional connector for connecting the optical device and the projection lens is necessary, so that the number of the components can be reduced. Further, when the projection lens attachment is integrated with the cooling device, the attachment component and production process for attaching the projection lens attachment to the cooling device can be eliminated. On the other hand, when the projection lens attachment is formed as a component independent of the cooling device and is attached to the cooling device, the projection lens attachment can be detached from the cooling device and the cooling device can be applied for cooling the other object, e.g. a light source device. Accordingly, the applicability of the cooling device can be improved.

A projector according to still another aspect of the present invention has: a light source; an optical modulator that modulates a light beam irradiated by the light source in accordance with image information to form an optical image; a projection optical system that enlarges and projects the optical image; and the above cooling device or the above optical device.

According to the above aspect of the present invention, approximately the same advantages as the above cooling device or the optical device can be obtained. Specifically, the cooling device can be applied not only on the optical device but also on the other components of the projector such as the light source device, and the object to be cooled can be efficiently cooled by the cooling device. Further, since the optical device that plays an important role for forming an optical image can be efficiently cooled, the operation of the projector can be stabilized and deterioration of the life span of the components of the projector on account of thermal deterioration can be prevented.

In the above aspect of the present invention, the projector may preferably have an exterior casing that houses an optical system including the light source and the optical modulator, in which an intake opening that draws in an outside air may preferably be formed on the exterior casing, in which the cooling device may preferably be located remote from the intake opening, and in which a sirocco fan that draws in an air by a rotation thereof and discharges the air in a rotary tangential direction thereof to guide the air toward the cooling device may preferably be provided on the intake opening.

According to the above arrangement, the cooling air to be used for cooling the object to be cooled by the cooling device is transferred by the sirocco fan. When the cooling device is provided on the optical device and an axial-flow fan is used for the cooling device, since it is required for the cooling device to transfer the cooling air simultaneously to the plurality of optical modulators attached to the color-combining optical system to cool the components, an axial-flow fan having large air-blowing area is preferably used. On the other hand, a sirocco fan has a great discharge pressure with low revolution number, which has excellent silentness as compared to axial-flow fans. According to the above arrangement, the cooling device can be located remote from the intake opening and the jet noise of the axial-flow fan of the cooling device does not leak to the outside of the projector, where the external air is drawn in by the silent sirocco fan and the external air is transferred to the axial-flow fan with a high discharge pressure, thereby securely cooling the optical device. Accordingly, the object to be cooled such as the optical device can be efficiently cooled and the silentness of the projector can be improved.

DETAILED DESCRIPTION OF PREFERRED EMBODIMENT(S)

A first embodiment of the present invention will be described below with reference to the attached drawings.

[1. First Embodiment]

(1) Exterior Arrangement

Figure 1:
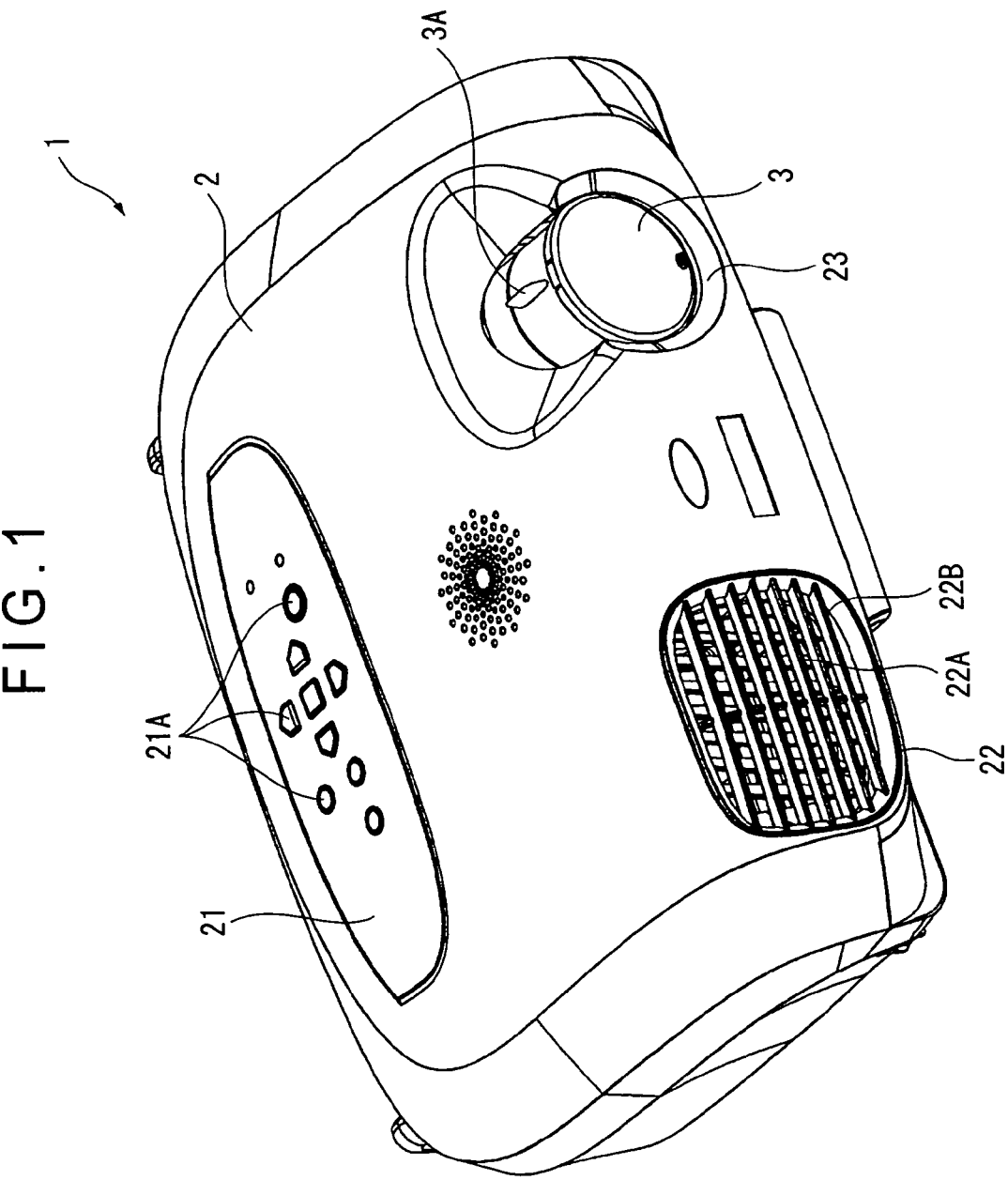
FIG. 1 is a perspective view showing a projector according to a first embodiment of the present invention.

FIG. 1 shows a projector according to the first embodiment. The projector 1 modulates a light beam irradiated by a light source in accordance with image information and projects the light beam on a projection surface such as a screen in an enlarged manner. As shown in FIG. 1, the projector 1 has an exterior case 2 and a projection lens 3 exposed from the exterior case 2.

The exterior case 2 is a synthetic resin exterior casing, which houses the body of the projector 1. An operation panel 21 provided with a plurality of switches 21A for actuating and adjusting the projector 1 is provided on the upper side of the exterior case 2. An exhaust port 22 is formed on the front left side (seen from the front side) of the exterior case 2. An exhaust fan (not shown) is disposed inside the exhaust outlet 22, the exhaust fan discharging the air having cooled the inside of the projector 1 from the exhaust port 22 to the outside of the projector 1. Further, a louver 22A having a plurality of fins 22B that extend in horizontal direction and are arranged in parallel is attached to the exhaust port 22. The louver 22A not only rectifies the air to be discharged but also shields the light between the inside and the outside of the projector 1. A cut 23 extending from the front side to the upper side is formed on the front right side of the exterior case 2 from which the distal portion of the projection lens 3 and the lever 3A are exposed.

The projection lens 3 enlarges and projects the optical image modulated by the body of the projector 1 in accordance with image information. The projection lens 3 is a lens set having a cylindrical lens barrel accommodating a plurality of lenses, which has a lever 3A for changing the relative position of the plurality of lenses. The lever 3A adjusts the focus and magnification of the projected image.

(2) Internal Arrangement

Figure 2:
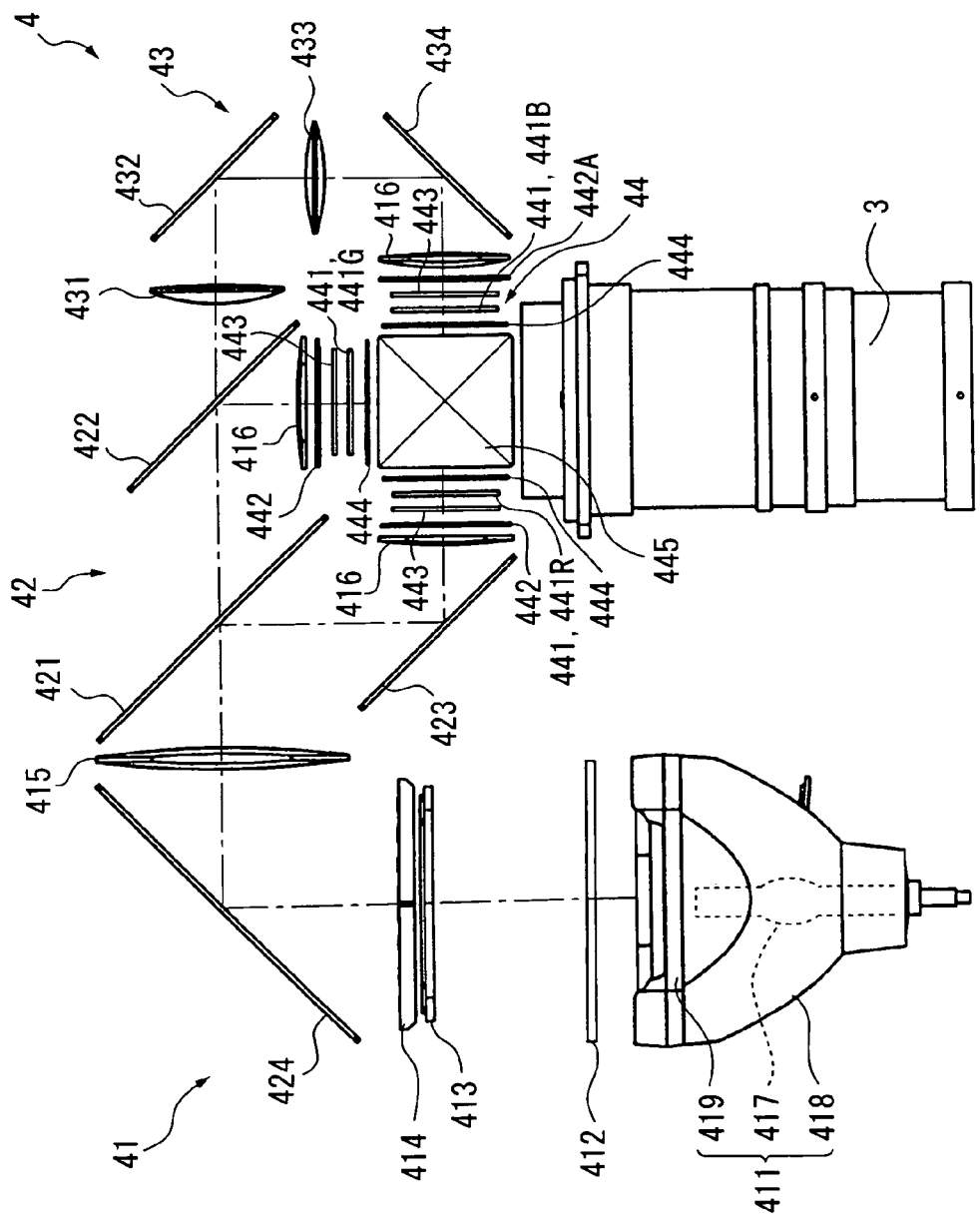
FIG. 2 is a schematic illustration showing an optical system of an optical unit of the first embodiment.

FIG. 2 is a schematic illustration showing the optical unit 4 accommodated in the body of the projector 1. The optical unit 4 modulates a light beam irradiated by a light source 411 in accordance with the image information to form an optical image, and forms a projected image on a screen through the projection lens 3.

The optical unit 4 includes functionally independent components of an integrator illuminating optical system 41, a color-separating optical system 42, a relay optical system 43, an optical device 44 integrating an optical modulator and a color-combining optical device, and a light guide 45 (FIG. 7) in which the optical components 41, 42, 43 and 44 are accommodated.

The integrator illumination optical system 41 is an optical system for equalizing the illuminance of the light beam irradiated by the light source on a plane orthogonal to an illumination optical axis. The integrator illuminating optical system 41 has a light source device 411, a first lens array 412, a second lens array 413, a polarization converter 414, a superposing lens 415 and field lenses 416.

The light source device 411 has a light source lamp 417 (a radial light source), a reflector 418, and an anti-explosion glass 419 covering the light-irradiation side of the reflector 418. The radial light beam irradiated by the light source lamp 417 is reflected by the reflector 418 to be an approximately parallel light beam and is irradiated toward the outside. In the present embodiment, a high-pressure mercury lamp is used as the light source lamp 417 and a parabolic mirror is used as the reflector 418. The light source lamp 417 may not be a high-pressure mercury lamp but may be a metal halide lamp or a halogen lamp. Further, though a parabolic mirror is used as the reflector 418, a collimating concave lens disposed on an irradiation-side of a reflector of an ellipsoidal mirror may alternatively be used. The details of the light source device 411 will be described below.

The first lens array 412 has small lenses arranged in a matrix, the lenses having substantially rectangular profile viewed in the illumination optical axis direction. The respective lenses separates the light beam irradiated by the light source lamp 417 into sub-beams and emits the sub-beams in the illumination optical axis direction.

The second lens array 413 is arranged approximately in the same manner as the first lens array 412, which includes small lenses arranged in a matrix. The second lens array 413 focuses the image of the small lenses of the first lens array 412 onto liquid crystal panels 441R, 441G and 441B of the optical device (described below) together with the superposing lens 415.

The polarization converter 414 converts the light from the second lens array 413 into substantially uniform polarized light, thereby enhancing the light utilization efficiency of the optical device 44.

Specifically, the respective sub-beams converted into substantially uniform polarized light by the polarization converter 414 are substantially superposed on the liquid crystal panels 441R, 441G and 441B of the optical device 44 by the superposing lens 415. Since only one-type of polarized light can be used in a projector 1 using the liquid crystal panels 441R, 441G and 441B that modulate polarized light, approximately half of the light beam from the light source lamp 417 emitting random polarized light cannot be used. Accordingly, with the use of the polarization converter 414, all of the light beams irradiated by the light source lamp 417 are converted into substantially uniform polarized light to enhance the light utilization efficiency of the optical device 44. Incidentally, such polarization converter 414 is disclosed in, for instance, Japanese Patent Laid-Open Publication No. H08-304739.

The color-separating optical system 42 has two dichroic mirrors 421 and 422, and reflection mirrors 423 and 424. The plurality of sub-beams irradiated by the integrator illuminating optical system 41 are separated into three color lights of red (R), green (G) and blue (B) by the two dichroic mirrors 421.

The relay optical system 43 has an incident-side lens 431, a relay lens 433, and reflection mirrors 432 and 434. The relay optical system 43 guides the color light (blue light) separated by the color-separating optical system 42 toward the below-described liquid crystal panel 441B of the optical device 44.

At this time, the dichroic mirror 421 of the color-separating optical system 42 transmits the green light and blue light of the light beam irradiated by the integrator illuminating optical system 41 through the reflection mirror 424 and reflects the red light. The red light reflected by the dichroic mirror 421 is reflected by the reflection mirror 423, which reaches to the liquid crystal panel 441R for red color through the field lens 416. The field lens 416 converts the respective sub-beams irradiated by the second lens array 413 into a light beam parallel to the central axis (main beam) and the field lenses 416 provided on the light-incident side of the other liquid crystal panels 441G and 441B function in the same manner.

In the blue and green lights transmitted through the dichroic mirror 421, the green light is reflected by the dichroic mirror 422, which reaches to the liquid crystal panel 441G for green light through the field lens 416. On the other hand, the blue light transmits through the dichroic mirror 422, which passes through the relay optical system 43 to reach the liquid crystal panel 441B for blue light through the field lens 416.

Incidentally, the relay optical system 43 is used for the blue light in order to avoid deterioration in the light utilization efficiency on account of light dispersion and the like caused by the longer length of the optical path of the blue light than the optical path of the other color light. In other words, the relay optical system 43 is used for directly transmitting the sub-beams incident on the incident-side lens 431 to the field lens 416. Incidentally, though the blue light of the three color lights passes through the relay optical system 43, the red light, for instance, may alternatively pass through the relay optical system 43.

The optical device 44 modulates the incident light beam in accordance with image information to form a color image. The optical device 44 has three incident-side polarization plates 442 on which the respective color lights separated by the color-separating optical system 42 are incident, three visual-angle corrector plates 443 disposed on the downstream of the respective incident-side polarization plates 442, the liquid crystal panels 441R, 441G and 441B (optical modulators) and irradiation-side polarization plates 444 disposed on the downstream of the respective visual-angle corrector plates 443, and a cross dichroic prism 445 (color-combining optical device).

Figure 3:
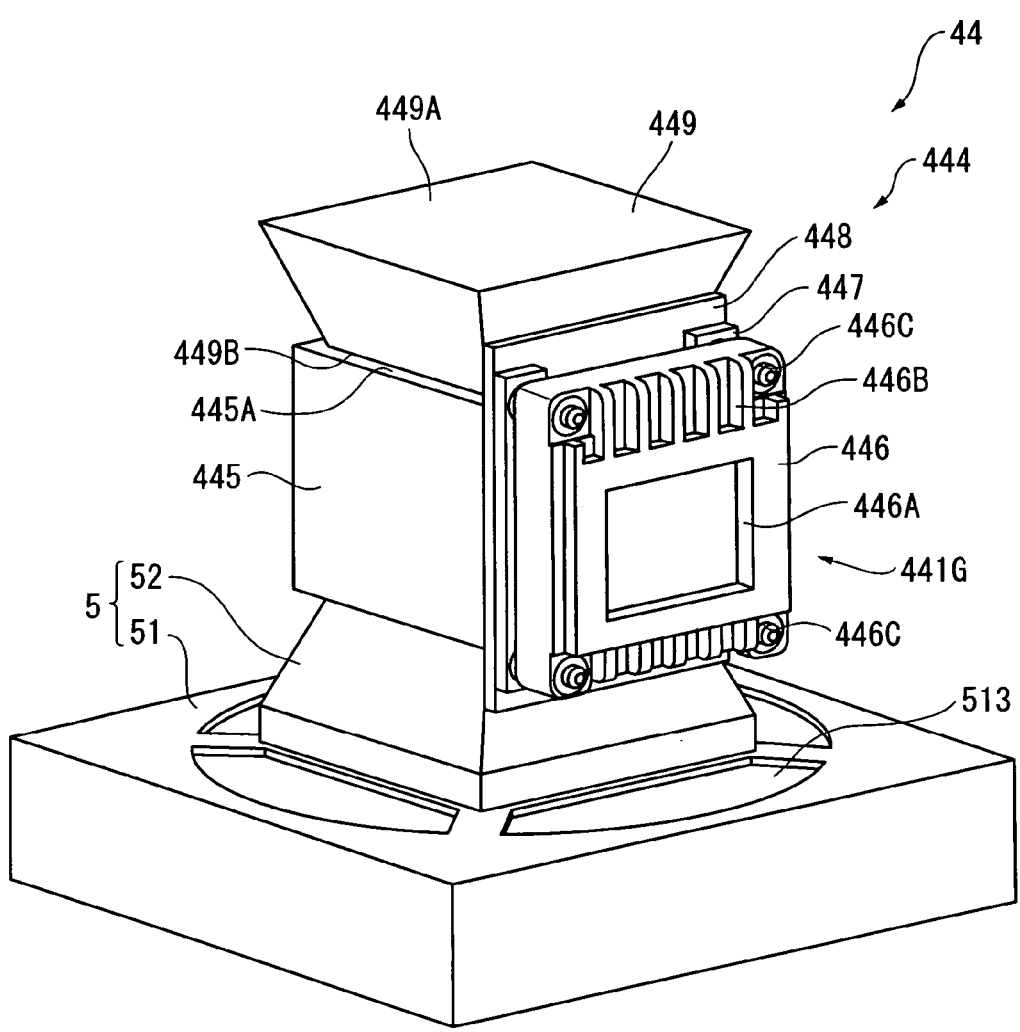
FIG. 3 is a perspective view showing an optical device and a cooling device of the first embodiment.
Figure 4:
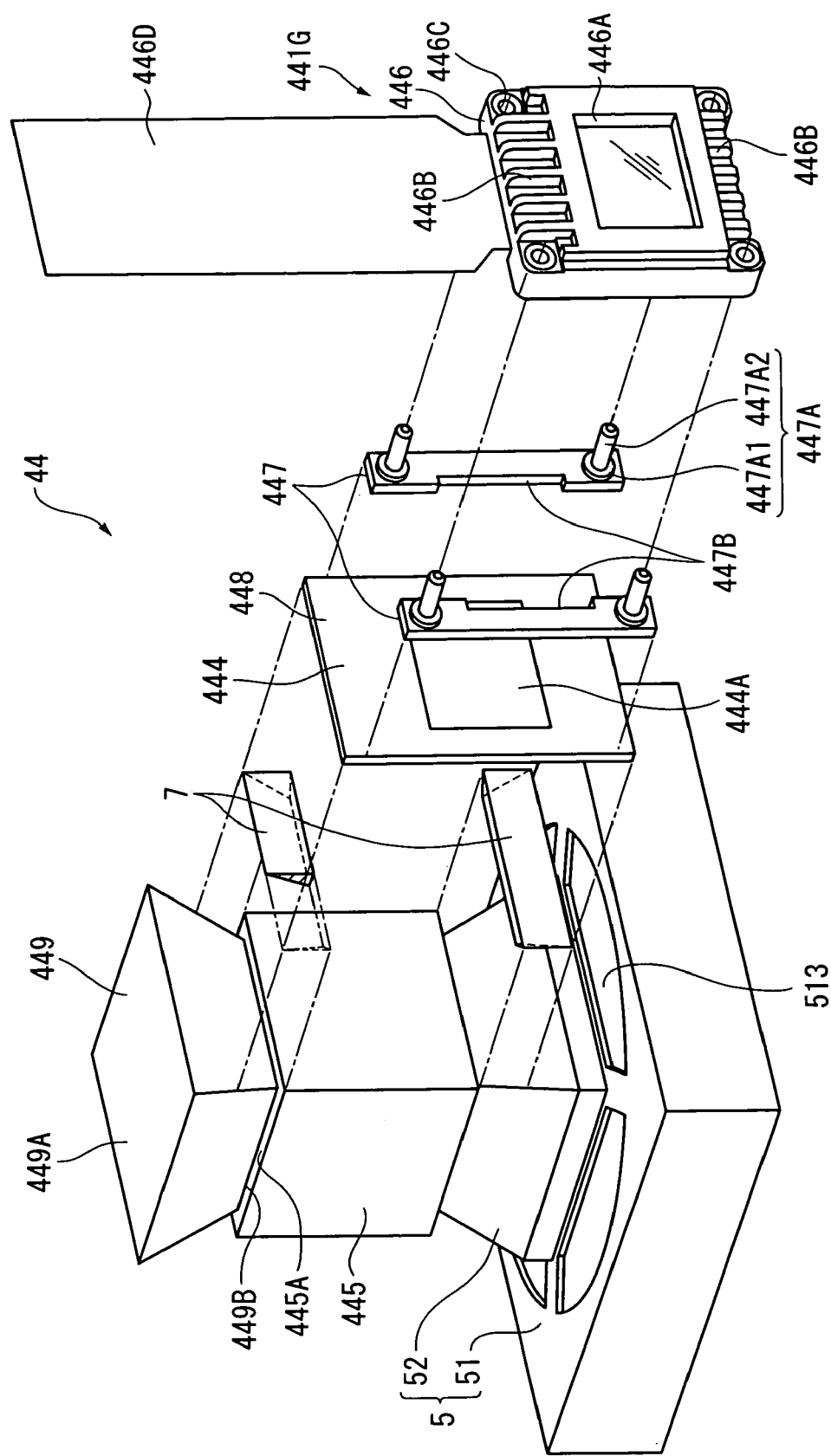
FIG. 4 is an exploded perspective view showing the optical device and the cooling device of the first embodiment.

The liquid crystal panels 441R, 441G and 441B irradiate the light beam incident thereon through the incident-side polarization plates 442 and the visual-angle corrector plates 443 after modulating the light beam in accordance with the image information. Each of the liquid crystal panels 441R, 441G and 441B has a liquid crystal panel body (not shown) and a holding frame 446 for accommodating the liquid crystal panel body thereinside (FIGS. 3 and 4). The liquid crystal panel body uses, for instance, a polycrystalline silicon TFT as a switching element, which has a pair of opposing transparent substrates with liquid crystal sealed therebetween. The details of the holding frame 446 will be described below.

The incident-side polarization plates 442 and the irradiation-side polarization plates 444 transmit only a polarized light in a predetermined direction and absorbs the other light beam, which have a substrate made of sapphire glass and the like with a polarization film attached thereon. The irradiation-side polarization plate 442 transmits the polarized light in a predetermined direction out of the respective color lights separated by the color-separating optical system 42. The irradiation-side polarization plate 444 transmits only the polarized light in a predetermined direction out of the light beams irradiated by the liquid crystal panels 441R, 441G and 441B. The polarization axis of the polarized light transmitted through the irradiation-side polarization plate 444 is orthogonal to the polarization axis of the polarized light transmitting through the incident-side polarization plate 442. The details of the irradiation-side polarization plate 444 will be described below.

The visual-angle corrector plate 443 has a substrate on which an optical conversion film is formed, the optical conversion film correcting the visual angle of the optical image formed by the liquid crystal panels 441R, 441G and 441B. The visual-angle corrector plate 443 compensates a birefringence generated on the liquid crystal panels 441R, 441G and 441B. The visual field angle of the projection image is enlarged by the visual-angle corrector plate 443 and the contrast of the projected image is enhanced.

The cross dichroic prism 445 combines the optical image irradiated by the irradiation-side polarization plate 444 and modulated for each color light to form a color image. In the cross dichroic prism 445, a dielectric multi-layer film for reflecting the red light and a dielectric multi-layer film for reflecting the blue light are formed along the boundaries of four right-angle prisms approximately in X-shape, the dielectric multi-layer films combining the three color lights.

The above-described liquid crystal panels 441R, 441G and 441B, the irradiation-side polarization plates 444 and the cross dichroic prism 445 are integrated as a unit.

(3) Optical Device

FIG. 3 shows a perspective view of the optical device 44. FIG. 4 is an exploded perspective view of the optical device 44.

As shown in FIGS. 3 and 4, the optical device 44 has a fixing member 447, a heat-radiation member 449 and a cooling device 5 in addition to the liquid crystal panels 441, the irradiation-side polarization plates 444 and the cross dichroic prism 445. Incidentally, in FIGS. 3 and 4, only the liquid crystal panel 441G is illustrated on behalf of the three liquid crystal panels 441 to omit the illustration of the other liquid crystal panels 441R and 441B.

As described above, the holding frame 446 is a component of the liquid crystal panel 441G, which is arranged as a metal container having a sidewall provided along the outer circumference of a rectangular plate, in which, though not illustrated, a liquid crystal panel body is housed and the opening of the container is closed by a fixing plate. The holding frame 446 is made of a heat-conductive metal such as aluminum.

A flexible cable 446D including a plurality of signal wires is inserted to the upper side of the holding frame 446, an end of the flexible cable 446D being connected with the liquid crystal panel body housed inside the holding frame 446 and the other end being connected with a control board (not shown) for controlling the operation of the projector 1.

An opening 446A that introduces the light beam on the liquid crystal panel body is formed approximately at the center of the light-incident side of the holding frame 446 at a size corresponding to the size of the liquid crystal panel body. In other words, the opening 446A defines an optical path of the light beam incident on the cross dichroic prism 445. A plurality of grooves 446B are formed in up and down direction on the upper and lower sides of the opening 446A. The groove 446B widens the surface area that is exposed to the cooling air in radiating the heat transferred from the liquid crystal panel body to enhance the cooling efficiency. Four attachment holes 446C are formed on both sides of the groove 446B, i.e. on the four corners of the holding frame 446. The holding frame 446 is attached to the fixing member 447 through the attachment hole 446C.

The fixing member 447 is a component for attaching the holding frame 446 to a heat-conductive plate 448. The fixing member 447 is made of a pair of symmetrical plate-shaped members of transparent material that transmit ultraviolet.

Pins 447A having round tip end are formed on both longitudinal ends of the light-incident side of the fixing member 447. The pin 447A has a cylindrical projecting base 447A1 and a cylindrical bonding portion 447A2 having a diameter smaller than the base 447A1 is formed on the tip end of the base 447A1. The diameter of the bonding portion 447A2 is slightly smaller than the diameter of the above-described attachment hole 446C of the holding frame 446 so that the bonding portion 447A2 can be inserted to the attachment hole 446C to be bonded. When the holding frame 446 is attached to the fixing member 447, a gap is formed between the holding frame 446 and the fixing member 447. The gap is for focus adjustment relative to the cross dichroic prism 445 and for circulating the cooling air. The width of the gap can be freely adjusted when the holding frame 446 is attached to the fixing member 447.

Notches 447B corresponding to the position of the irradiation-side polarization plate 444 are formed approximately at the center of the opposing sides of the fixing members 447. The fixing members 447 are attached on both ends of the light-incident side of the heat-conductive plate 448 by an ultraviolet-curing adhesive so that the fixing members 447 are approximately parallel with each other.

The heat-conductive plate 448 is a vertically elongated board having substantially rectangular profile, which is made of sapphire glass having higher heat conductivity than a white glass sheet. A polarization film 444A is attached approximately at the center of the light-incident side of the heat-conductive plate 448, the polarization film 444A and the heat-conductive plate 448 forming the irradiation-side polarization plate 444.

The light-irradiation side of the heat-conductive plate 448 is attached to the light-incident side of the cross dichroic prism 445.

Though the heat-conductive plate 448 is made of sapphire glass in the present embodiment, quartz crystal may alternatively be used. According to the above arrangement, a heat-conductive plate similar to the heat-conductive plate 448 of sapphire glass can be provided. Specifically, a heat-conductive plate having high heat conductivity can be formed with the use of quartz crystal. Since the softening point of quartz crystal is higher than an ordinary glass and thermal expansion coefficient is small, high heat-resistance can be applied on the heat-conductive plate. Further, since less amount of impurities are contained in quartz crystal, the light beam is less likely to be absorbed and high light transmissivity can be obtained. Accordingly, decrease in the light volume caused when the light beam transmitted through the polarization film 444A attached at the center of the heat-conductive plate 448 is absorbed can be prevented.

The heat-radiation member 449 is attached on an upper side 445A of upper and lower sides of the cross dichroic prism 445 (i.e. a pair of sides substantially orthogonal with the light-incident side) through a heat-conductive rubber 7. The heat-radiation member 449 is an approximately truncated pyramid formed by horizontally cutting a pyramid of a heat-conductive metal such as aluminum, where lengthwise and crosswise dimensions of a lower base 449A are greater than the lengthwise and crosswise dimensions of the upper side 445A and lengthwise and crosswise dimensions of an upper base 449B are smaller than the lengthwise and crosswise dimensions of the upper side 445A. The heat-radiation member 449 is disposed upside down so that the upper base 449B is in contact with the upper side 445A of the cross dichroic prism 445.

The heat-radiation member 449 is abutted to the cross dichroic prism 445 and is also in contact with the upper end of the heat-conductive plate 448 through the heat-conductive rubber 7. Accordingly, the heat on the heat-conductive plate 448 is conducted to the heat-radiation member 449 through the rubber 7 to be radiated.

Though the rubber 7 is illustrated as an approximately triangular prism in FIG. 4, when the heat-radiation member 449 is located on the upper side 445A of the cross dichroic prism 445 and the rubber 7 is attached to be in contact with the upper side 445A and the lateral side of the heat-radiation member 449, the rubber 7 is bulged relative to the position at which the heat-conductive plate 448 is to be attached. When the heat-conductive plate 448 is attached on the bulging surface of the rubber 7, the rubber 7 is compressed to be an approximately triangular prism and the heat-conductive plate 448 is in close contact with the heat-radiation member 449. Though the heat-conductive rubber 7 is used in the present embodiment, thermoplastic heat-conductive adhesive may alternatively be used.

The cooling device 5 has a fan body 511 (see FIG. 5) thereinside, which cools the optical device 44 by blowing the cooling air from a blower hole 513 formed on the upper side of the cooling device 5. The cooling device 5 is attached to a lower side 445B of the cross dichroic prism 445 and is in contact with the heat-conductive plate 448 through the rubber 7 in the same manner as the heat-radiation member 449.

Figure 5:
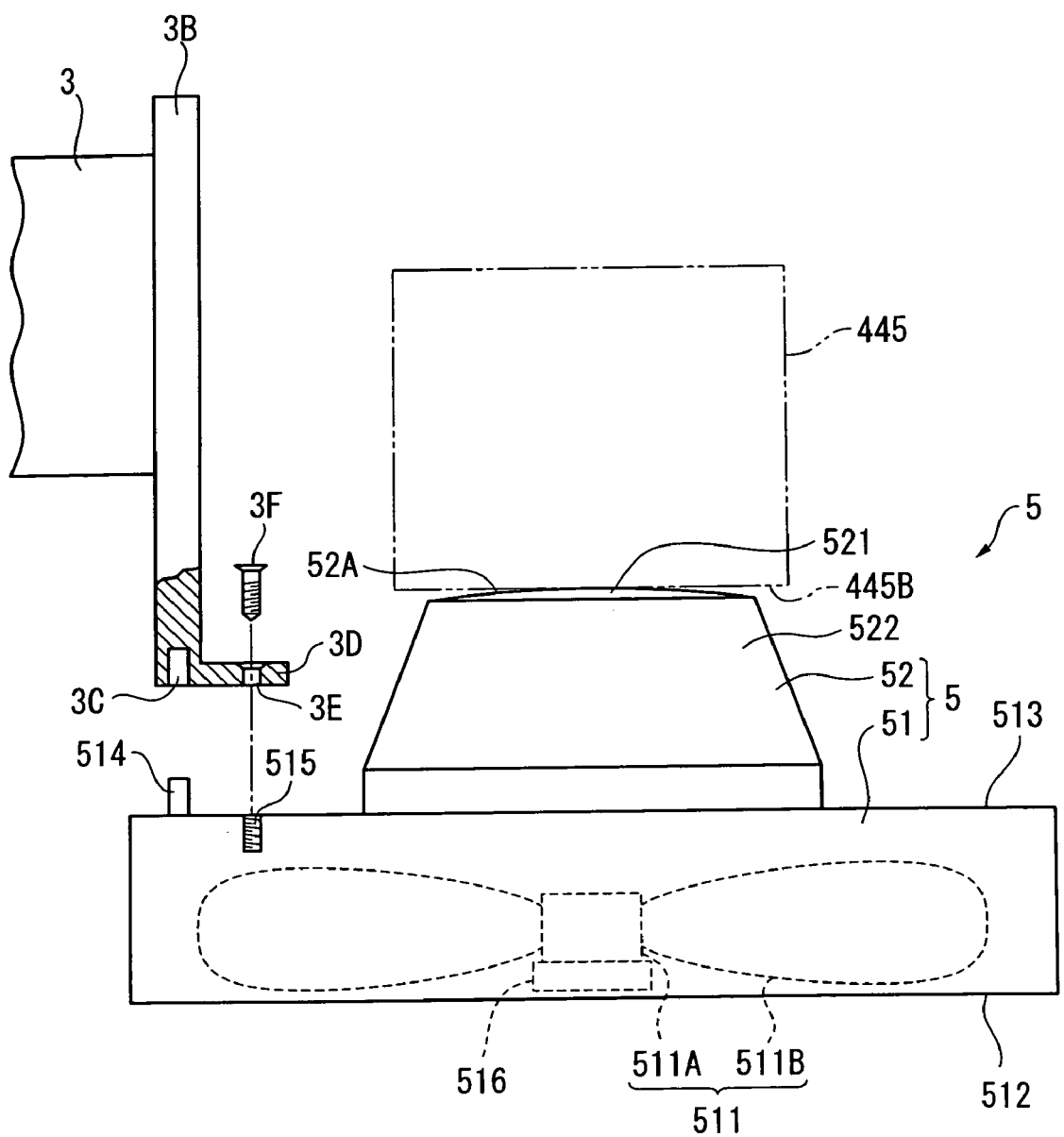
FIG. 5 is a side elevational view showing the cooling device of the first embodiment.

FIG. 5 is a side elevational view of the cooling device 5.

As shown in FIG. 5, the cooling device 5 has a frame 51 made of a material of high heat conductivity such as aluminum.

The frame 51 is a chassis that houses the fan body 511 thereinside, the frame 51 having an approximately planarly-viewed rectangular profile. The fan body 511 has a fan motor 516 (rotary drive source) and a fan blade 511B (vane) formed on a circumference of a rotary shaft 511A of the fan motor 516 in a radial direction. The fan motor 514 rotates the rotary shaft 511A by electric power supplied by a power source unit (not shown) provided in the projector 1 through a power cable, the rotation of the rotary shaft 511A causing the fan blade 511B to transfer the cooling air upward.

An air intake 512 for the cooling air transferred by the fan body 511 is formed on the bottom side of the frame 51.

A base portion 52, four blower holes 513, a convex portion 514 for attaching a vertical plate 3B provided on the projection lens 3 and a threaded groove 515 is formed on the upper side of the frame 51.

The base portion 52 is a base having approximately trapezoidal lateral profile for supporting the cross dichroic prism 445, which is integrated with the frame 51 approximately at the center of the upper side of the frame 51, i.e. at a position corresponding to the rotary shaft 511A of the fan motor 516. As described above, the heat-conductive plate 448 is abutted to the base portion 52. Accordingly, the heat of the irradiation-side polarization plate 444 is conducted to the base portion 52 through the heat-conductive plate 448 to be radiated. In other words, the base portion 52 is a heat radiator to which the heat of the irradiation-side polarization plate 444 is conducted and the conducted heat is radiated.

The upper side 52A of the base portion 52 is a support surface for the cross dichroic prism 445 to be attached, of which central portion is bulged in an out-plane direction as shown in FIG. 5. The bulging portion 521 is for adjusting the attitude of the cross dichroic prism 445 relative to the incident light beam when the cross dichroic prism 445 is supported and fixed.

The lateral side of the base portion 52 is a contact surface 522 to be abutted to the lower end of the heat-conductive plate 448. The contact surface 522 is slanted so that the cross sectional area thereof in the horizontal direction of the base portion 52 is increased toward the lower side, so that, even when there is a slight error on the dimension of the cross dichroic prism 445, the heat-conductive plate 448 attached to the light-incident side of the cross dichroic prism 445 keeps in contact with the contact surface 522.

The blower hole 513 is an opening for blowing the cooling air from the fan body 511, four of which is provided to surround the base portion 52. In other words, the blower holes 513 are arranged so that the cooling air is approximately uniformly transferred from the fan body 511 to the three light-incident sides and the light-irradiation side formed on the cross dichroic prism 445 supported by the base portion 52.

The convex portion 514 is convexly formed on the upper side of the frame 51 on the light-irradiation side when the cross dichroic prism 445 is mounted on the base portion 52. The convex portion 514 is engaged with a concave portion 3C formed on the lower end of the vertical plate 3B as a plate-shaped projection lens attachment provided on the projection lens 3.

The threaded groove 515 is formed on the upper side of the frame 51 at a position corresponding to a hole 3E formed on an extension 3D extending in approximately horizontal direction from the lower end of the vertical plate 3B. A screw 3F inserted in the hole 3E is screwed to the threaded groove 515.

The convex portion 514 is engaged with the concave portion 3C of the vertical plate 3B to locate the vertical plate 3B on the upper side of the frame 51. After determining the position of the vertical plate 3B, the screw 3F inserted in the hole 3E is screwed to the threaded groove 515 to fix the vertical plate 3B on the cooling device 5. Incidentally, desired number of the convex portion 514 and the threaded groove 515 may be formed on the upper side of the frame 51.

Figure 6:
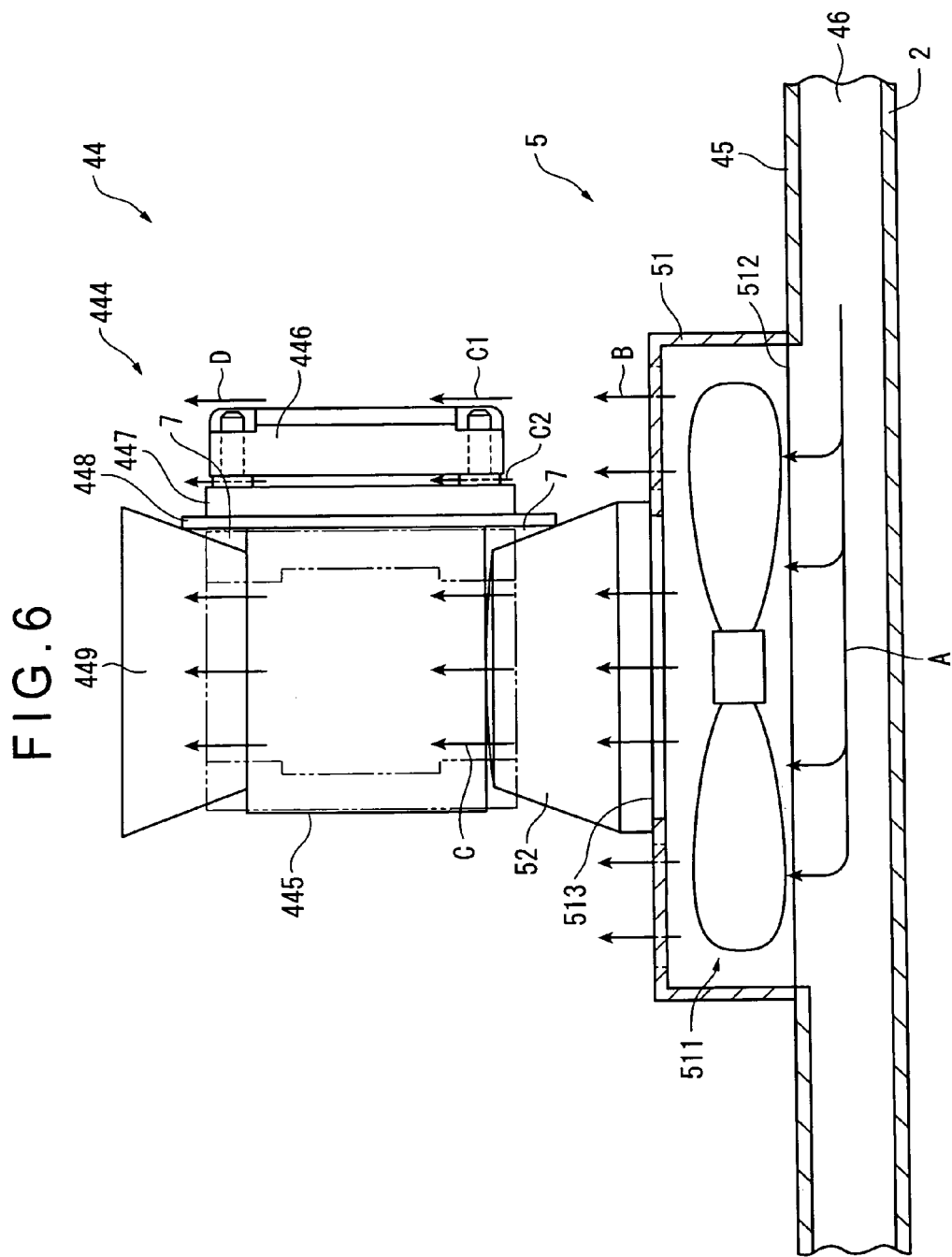
FIG. 6 is a partial cross section showing the optical device and the cooling device of the first embodiment.

FIG. 6 is a cross section of the projector 1 around the cooling device 5 with the optical device 44 being attached.

As shown in FIG. 6, a duct 46 is formed between the bottom side of a light guide 45 (optical equipment housing) and the bottom side of the exterior case 2 inside the projector. Though not illustrated, the duct 46 is opened to the outside of the projector 1 to be in communication with an intake opening located remote from the cooling device 5, and the air outside the projector 1 is drawn in by a sirocco fan provided in the intake opening to be circulated in the duct 46. The air intake 512 formed on the bottom side of the cooling device 5 is also opened to the duct 46, so that the outside air flowing in the duct 46 is drawn in by the fan body 511 of the cooling device 5 from the air intake 512 in the direction of an arrow A to be transferred in the direction of an arrow B toward the optical device 44. The transferred cooling air goes upward in the direction of an arrow C while cooling the base portion 52 to which the heat is conducted from the irradiation-side polarization plate 444 through the heat-conductive plate 448 and the heat-conductive rubber 7. The cooling air rising upward in the direction of the arrow C is split in two, one of the split flows going along the light-incident side of the holding frame 446 to be circulated in a direction of an arrow C1 to cool the front side of the holding frame 446. The other flow goes between the two fixing members 447, i.e. in a direction of an arrow C2 to cool the irradiation-side polarization plate 444 and the backside of the holding frame 446 from the lower side. The cooling air goes further upward in a direction of an arrow D to cool the heat-radiation member 449 to which the heat is conducted. The cooling air having cooled the optical device 44 is exhausted to the outside of the projector 1 by an exhaust fan (not shown) from the exhaust port (FIG. 1) to the outside of the projector 1.

(4) Advantages of Embodiment

According to the present embodiment, following advantages can be obtained.

(1-1) The cross dichroic prism 445 of the optical device 44 is supported by the base portion 52 integrated with the frame 51 of the cooling device 5. The irradiation-side polarization plate 444 is attached to the heat-conductive plate 448 attached to the light-incident side of the cross dichroic prism 445, and the heat generated on the irradiation-side polarization plate 444 is conducted to the base portion 52 through the heat-conductive plate 448 abutted to the contact surface 522 formed on the base portion 52 and the heat-conductive rubber 7 to be radiated. Accordingly, since the heat on the irradiation-side polarization plate 444 is cooled by the two cooling mechanism of the air blast by the fan body 511 and heat-radiation from the base portion 52 to which the heat is conducted, the irradiation-side polarization plate 444 can be more efficiently cooled as compared with an arrangement where the irradiation-side polarization plate 444 is cooled only by blowing the cooling air thereon.

(1-2) The cooling device 5 is made of a metal. Since the heat conductivity of metal is higher than synthetic resin etc., the heat on the irradiation-side polarization plate 444 can be rapidly conducted from the heat-conductive plate 448 to the base portion 52 of the cooling device 5. Accordingly, the heat can be efficiently conducted to the base portion 52 as compared to a cooling device made of synthetic resin etc. The cooling effect of the cooling device 5 can be improved by enlarging the area on which the heat is retained. Further, since the frame 51 is made of metal, sufficient strength required for supporting the cross dichroic prism 445 can be secured.

(1-3) The heat-conductive plate 448 on which the irradiation-side polarization plate 444 is attached is abutted to the contact surface 522 of the base portion 52. Accordingly, the heat on the heat-conductive plate 448 is directly transferred from the contact surface 522 abutted to the heat-conductive plate 448 to the base portion 52. Accordingly, heat conduction efficiency from the heat-conductive plate 448 to the base portion 52 can be improved and the heat-conductive plate 448 can be efficiently cooled.

(1-4) The heat-conductive plate 448 on which the irradiation-side polarization plate 444 is attached is made of sapphire glass. Since sapphire glass has high heat conductivity, the heat generated on the irradiation-side polarization plate 444 is rapidly conducted to the heat-conductive plate 448. Accordingly, abrupt increase in the temperature of the irradiation-side polarization plate 444 can be restrained, thereby inhibiting the thermal deterioration of the irradiation-side polarization plate 444. Since the heat is rapidly conducted to the cooling device 5 by virtue of the high heat conductivity of the sapphire glass, the irradiation-side polarization plate 444 can be efficiently cooled by the heat radiation to the base portion 52 and the cooling air blown by the fan body 511. Further, since sapphire glass has higher transmissivity of the incident light beam than an ordinary glass sheet, with the use of the heat-conductive plate 448 made of sapphire glass, the light beam irradiated on the optical device 44 is less likely to be absorbed by the heat-conductive plate 448, thus avoiding decrease in the light volume of the light beam. Quartz crystal may be used instead of sapphire glass for achieving approximately the same advantages as the above.

(1-5) The cross dichroic prism 445 is supported by the base portion 52 of the cooling device 5. Accordingly, the cooling device 5 can be used as a base of the optical device 44. Since no additional component for supporting the cross dichroic prism 445 is necessary, the structure of the optical device 44 can be simplified and the production steps and cost can be reduced. The base portion 52 is formed on the frame 51 of the cooling device 5 at a position corresponding to the rotary shaft 511A of the fan body 511. In the above arrangement, the cooling air can be uniformly blown to the heat-conductive plate 448 attached to the respective light-incident sides of the cross dichroic prism 445 supported by the base portion 52. Accordingly, the heat-conductive plates 448 and the irradiation-side polarization plates 444 can be uniformly cooled by blowing the cooling air to the heat-conductive plates 448.

(1-6) The bulging portion 521 for adjusting the attitude of the cross dichroic prism 445 supported thereon is formed on the base portion 52 of the cooling device 5. Accordingly, the cross dichroic prism 445 can be located at an appropriate position relative to the light beam irradiated by the irradiation-side polarization plate 444 by adjusting the attitude of the cross dichroic prism 445 that is likely to cause minute dimensional error. Therefore, even when the light-incident side of the cross dichroic prism 445 is inclined, the cross dichroic prism 445 can be attached at an appropriate position relative to the cooling device 5.

(1-7) The convex portion 514 and the threaded groove 515 for attaching the vertical plate 3B provided on the projection lens 3 is formed on the frame 51 of the cooling device 5. According to the above arrangement, when the cooling device 5 is used for cooling the optical device 44 and the projection lens 3 is attached to the cooling device 5, the vertical plate 3B of the projection lens 3 can be attached to the cooling device 5 by the convex portion 514 and the threaded groove 515. Alternatively, when the cooling device 5 is used for cooling the other components of the projector 1, the cooling device 5 can be attached without using the convex portion 514 and the threaded groove 515 for cooling the components. Accordingly, the applicability of the cooling device 5 can be improved. When the vertical plate 3B is made of metal, further higher heat conductivity can be obtained.

(1-8) The duct 46 is formed between the bottom side of the exterior case 2 inside the projector 1 and the bottom side of the light guide 45. The external air drawn in from the outside of the projector 1 is circulated in the duct from the intake opening (not shown) located remote from the cooling device 5 by the sirocco fan (not shown) provided on the opening. The external air is drawing through the intake opening 512 of the cooling device 5 opened to the duct 46 to be used for cooling the optical device 44. According to the above arrangement, since the cooling device 5 is located remote from the intake opening, the noise such as jet noise of the cooling device 5 can be prevented from leaking to the outside of the projector 1. Since the sirocco fan has great discharge pressure with a low revolution number and is highly silent, the silentness of the projector 1 can be improved and the optical device 44 can be securely cooled by the cooling device 5 by blowing the external air to the cooling device 5 by the sirocco fan. Further, no opening is necessary around the cooling device 5 in the exterior case 2 of the projector 1. Accordingly, the sound of the fan body 511 of the cooling device 5 is not leaked to the outside of the projector 1 and the freedom of the design of the appearance of the projector 1 can be improved.

[2. Second Embodiment]

Next, a projector according to a second embodiment of the present invention will be described below. The projector of the second embodiment has approximately the same arrangement as the projector described in the first embodiment except that an attaching portion for attaching the projection lens is integrally formed on the cooling device for cooling the optical device. Incidentally, in the following description, the same reference numerals will be attached to the same or approximately the same components as the above-described components to omit the description thereof.

Figure 7:
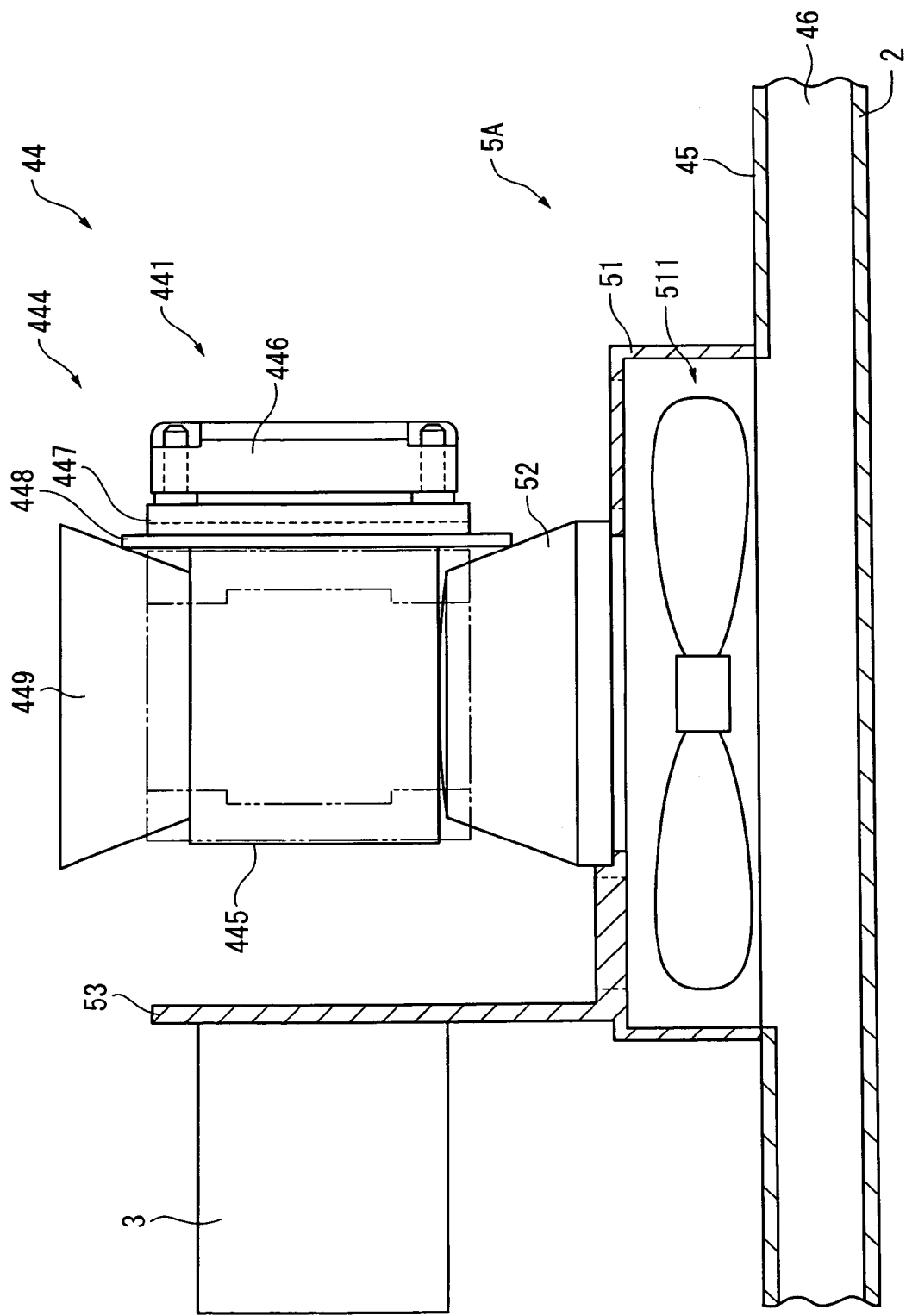
FIG. 7 is another partial cross section showing an optical device and a cooling device of a second embodiment.

FIG. 7 shows a cooling device 5A provided on the projector 1 according to the second embodiment. The cooling device 5A is arranged approximately in the same manner as the cooling device 5, which includes the frame 51 (chassis) that accommodates the fan body 511, and the base portion 52 integrally formed on the frame for supporting the cross dichroic prism 445 of the optical device 44. The cooling device 5A has an attaching portion 53 (projection lens attachment) formed on the upper side of the frame 51 instead of the convex portion 514 and the threaded groove 515 of the cooling device 5. The attaching portion 53 is for supporting the projection lens 3 and determining the position thereof, which is formed as a plate approximately vertically extending from an end of the upper side of the frame 51 on the light-irradiation side of the optical device 44. The projection lens 3 is disposed on the optical axis of the light beam irradiated by the optical device 44 by the attaching portion 53.

According to the second embodiment of the present invention, following advantage as well as approximately the same advantages as the above (1-1) to (1-8) can be obtained.

(2-1) Since the attaching portion 53 for supporting and determining the position of the projection lens 3 is formed on the cooling device 5A, the cross dichroic prism 445 can be precisely located at the back-focus position of the projection lens 3. Further, the optical device 44 and the projection lens 3 can be connected with the cooling device 5A by the base portion 52 and the attaching portion 53, no additional connector for connecting both of the components is necessary, thus reducing the number of the components.

[3. Modifications of Embodiment]

The scope of the present invention is not restricted to the above embodiment but includes following modifications as long as an object of the present invention can be achieved.

Though the cooling devices 5 and 5A cool the optical device 44, the cooling devices may be used for cooling the other components. For instance, the cooling devices may be used for the other heat source of the projector such as the light source device 411 and a power source unit. The cooling device of the present invention may be used for cooling a component of a device other than a projector such as an IC disposed on a control board of electronics.

Though the cooling devices 5 and 5A, the holding frame 446 and the heat-radiation member 449 are made of metal such as aluminum in the above embodiments, other metal such as magnesium, titanium and copper or alloy containing the above metal as main components may be used. In other words, any material may be used as long as the material has a high heat conductivity.

Though the base portion 52 of the cooling devices 5 and 5A are integrated with the frame 51 in the above embodiments, the base portion may be separately formed and attached on the frame. According to the above arrangement, when the fan body provided inside the frame 51 is malfunctioned, the frame 51 can be detached for repairing and exchanging the fan body. Incidentally, when the base portion 52 is integrated with the frame 51, the process for attaching the base portion 52 on the frame 51 can be omitted. Further, since no adhesive is necessary between the frame 51 and the base portion 52, the heat conducted on the base portion 52 can be easily conducted to the frame 51, thus improving the cooling efficiency.

Though the heat-conductive plate 448 is formed of sapphire glass or quartz crystal in the above embodiments, other glass material, synthetic resin and the like may be used. In other words, any material may be used as long as the light beam irradiated from the irradiation-side polarization plate 444 can be transmitted and the heat generated on the irradiation-side polarization plate 444 can be conducted to the base portion of the cooling device and the heat-conductive member. Incidentally, with the use of sapphire glass or quartz crystal, a heat-conductive plate with excellent light-transmissivity and high heat conductivity can be provided.

Though the heat-conductive rubber 7 is used for attaching the cooling devices 5 and 5A and the heat-radiation member 449 to the optical device 44, a heat-conductive adhesive and the like may alternatively be used. In other words, any component may be used as long as the object to be cooled can be attached to the cooling device in a manner that the heat of the object can be conducted to the cooling device.

Though the fixing member 447 is composed of two plate members in the above embodiments, the fixing member 447 may be made of a single plate member having the pin 447A on the four corners of the plate member. Incidentally, by arranging the fixing member 447 with the two plate members, the channel of the cooling air blown from the lower side by the cooling device 5 can be secured, thus securely cooling the irradiation-side polarization plate 444.

Though the projector 1 using three optical modulators are taken as an example in the above embodiments, the present invention may be applied to a projector using a single optical modulator, two optical modulators or more than three optical modulators.

Though a liquid crystal panel is used as the optical modulator in the above embodiments, an optical modulator other than the liquid crystal panel such as a device using a micro-mirror may be used.

Though a transmissive optical modulator having different light-incident side and light-irradiation side is used in the above embodiments, a reflective optical modulator having common light-incident side and light-irradiation side may be used.

Though a front-type projector that projects an image in a direction for observing a screen is taken as an example in the above embodiments, the present invention may be applied to a rear-type projector that projects an image in a direction opposite to the direction for observing the screen.

What is claimed is:

1. An optical device, comprising:
a plurality of optical modulators that respectively modulate each of a plurality of color lights in accordance with image information;
a color-combining optical system having a plurality of light-incident sides opposing to the optical modulators, the color-combining optical system combining the color lights modulated by the optical modulators;
a plurality of optical converters respectively disposed between the optical modulators and the plurality of light-incident sides; and
a cooling device that blows a cooling air to an object to be cooled, the cooling device including a fan body having a vane supported by a rotary shaft of a rotary drive source and a chassis that houses the fan body, the chassis being made of a heat-conductive material and having a heat radiator that radiates the heat generated on the object to be cooled to an outside by heat-conduction, the heat radiator having a trapezoidal cross section along an air-blowing direction of the cooling device, the heat radiator abutting the chassis with a longer side of parallel sides of the trapezoidal cross section,
a heat-conductive plate that opposes to the light-irradiation side and conducts the heat generated on the optical modulator and/or the optical converter being provided on the light-incident side of the color-combining optical system,
the heat-conductive plate being abutted to the heat-radiator of the chassis of the cooling device.

2. The optical device according to claim 1, the chassis being made of metal.

3. The optical device according to claim 1, a contact surface to be in contact with the object to be cooled being formed on the chassis.

4. The optical device according to claim 1, the heat-conductive plate being made of sapphire glass or quartz crystal.

5. The optical device according to claim 1, a base that supports the color-combining optical system being formed on the chassis of the cooling device at a position corresponding to the rotary shaft of the rotary drive source.

6. The optical device according to claim 5, a bulging portion that adjusts the attitude of the color-combining optical system relative to the chassis being formed on a surface of the base on which the color-combining optical system is supported.

7. The optical device according to claim 1, the chassis having a projection lens attachment that extends in an air-blow direction of the cooling device on which a projection lens that enlarges and projects the light beam irradiated by the color-combining optical system is attached.

8. A projector, comprising:
a light source;
an optical modulator that modulates a light beam irradiated by the light source in accordance with image information to form an optical image;
a projection optical system that enlarges and projects the optical image formed by the optical modulator; and
a cooling device that blows a cooling air to a heated object to be cooled, the cooling device including a fan body that has a vane supported by a rotary shaft of a rotary drive source and a chassis that houses the fan body, the chassis being made of a heat-conductive material and having a heat radiator that radiates a heat generated on the object to be cooled to an outside by heat conduction, the heat radiator having a trapezoidal cross section along an air-blowing direction of the cooling device, the heat radiator abutting the chassis with a longer side of parallel sides of the trapezoidal cross section.

9. The projector according to claim 8, the chassis being made of metal.

10. The projector according to claim 8, a contact surface to be in contact with the object to be cooled being formed on the chassis.

11. The projector according to claim 8, further comprising:

an exterior casing that houses an optical system including the light source and the optical modulator, an intake opening that draws in an outside air being formed on the exterior casing, the cooling device being located remote from the intake opening, and a sirocco fan that draws in an air by a rotation thereof and discharges the air in a rotary tangential direction thereof to guide the air toward the cooling device being provided on the intake opening.

* * * * *